May 12, 1970 F. T. COX, JR 3,511,103
BRAKE MECHANISM

Filed July 9, 1968 3 Sheets-Sheet 1

INVENTOR.
FRANK T. COX, JR.
BY
Strauch, Nolan, Neale,
Nies & Kurz
ATTORNEYS

May 12, 1970     F. T. COX, JR     3,511,103
BRAKE MECHANISM

Filed July 9, 1968     3 Sheets-Sheet 2

INVENTOR.
FRANK T. COX, JR.
BY
Strauck, Nolan, Neale,
Nies & Kurz
ATTORNEYS

May 12, 1970      F. T. COX, JR      3,511,103
BRAKE MECHANISM
Filed July 9, 1968      3 Sheets-Sheet 3
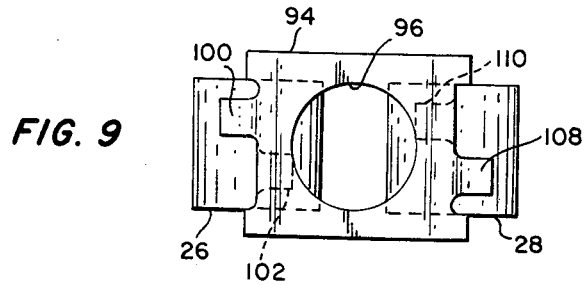
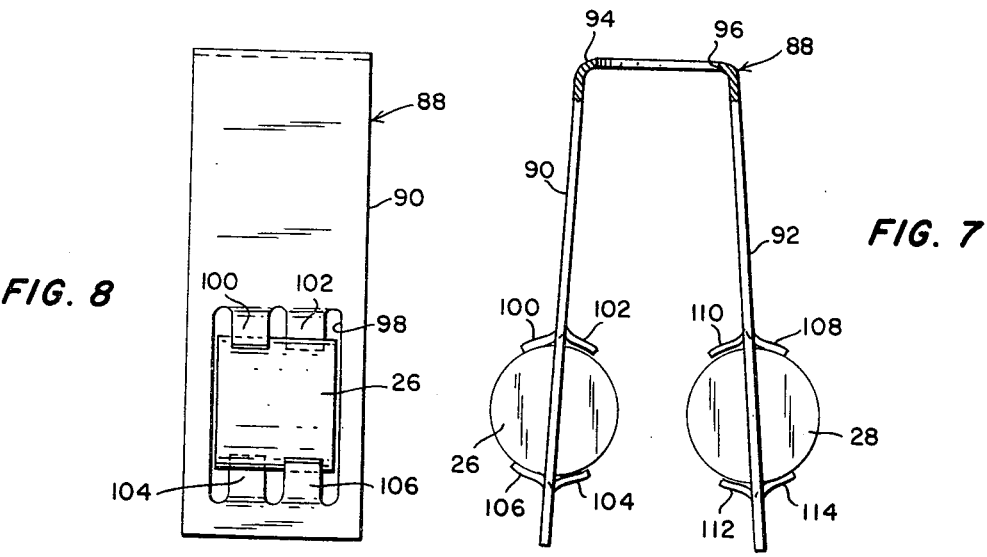
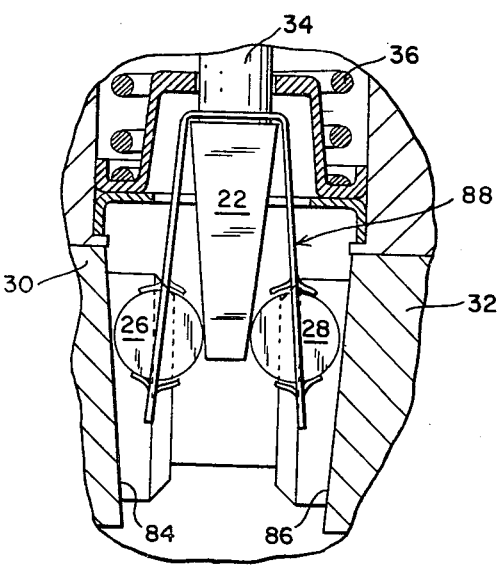
INVENTOR.
FRANK T. COX, JR.
BY
Strauch, Nolan, Neale,
Nies & Kurz
ATTORNEYS United States Patent Office 3,511,103
Patented May 12, 1970

1

3,511,103
BRAKE MECHANISM
Frank T. Cox, Jr., Ashtabula, Ohio, assignor, by mesne assignments, to Rockwell-Standard Company, Pittsburgh, Pa., a corporation of Delaware
Filed July 9, 1968, Ser. No. 743,462
Int. Cl. F16d 51/00
U.S. Cl. 74—110          6 Claims

ABSTRACT OF THE DISCLOSURE

A wedge-operated brake in which cylindrical rollers loosely supported in a cage are interposed between a power-operated wedge and the ends of the brake shoes.

BACKGROUND OF THE INVENTION

Wedge-type brake actuators have long been known and are now in wide-spread use. Examples of such actuators now in use are disclosed in U.S. Pats. 3,037,584 and 3,068,964 owed by applicant's assignee. Such actuators include a pair of plungers engageable with adjacent ends of a pair of brake shoes, the plungers being urged apart to force the shoes into contact with the surrounding drum by an actuator having a wedge-shaped end displaced into the space between the adjacent ends of the plungers by fluid pressure—air or hydraulic. Anti-friction means, typically rollers, are carried by a cage supported on the actuator and are interposed between the surfaces of the wedge and the ends of the plungers to provide an anti-friction force-transmitting connection between the wedge and the plungers.

Invariably the anti-friction rollers have been provided with arbors or trunnions at their opposite ends rotatably received in openings provided in the cage. This construction, while reasonably satisfactory in operation, was costly to manufacture since it required additional manufacturing steps and the maintenance of close tolerances in the cage as well as on the rollers.

SUMMARY OF THE INVENTION

The present invention is concerned primarily with improvements in the anti-friction rollers and the cage which carries them to provide a less expensive assembly having improved performance and extended life.

More specifically the present invention provides a cage, which may be formed as a one-piece stamping, the cage being so constructed that it accommodates and positions the anti-friction rollers without the need for trunnions or arbors thus permitting the use of plain cylindrical pieces as the anti-friction means.

In addition to cost advantages to be derived from the elimination of trunnions and bearings the invention provides significant performance advantages in that the anti-friction rollers are inherently self-aligning which reduces friction losses, provides for more effective force transmission, and eliminates localized wear on the rollers, the cage, the wedge and the plungers.

It is accordingly the principal purpose and object of the present invention to provide an improved wedge-operated brake having the foregoing cost and performance advantages.

Additional objects and advantages will become apparent as the description proceeds.

2

Figure 4:
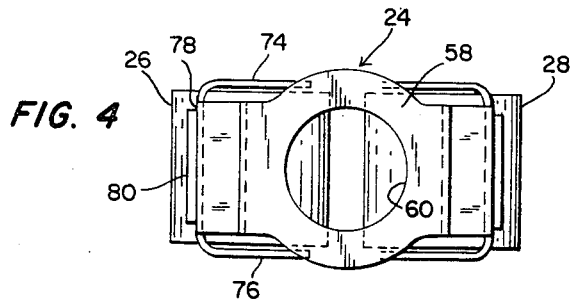
Figure 3:
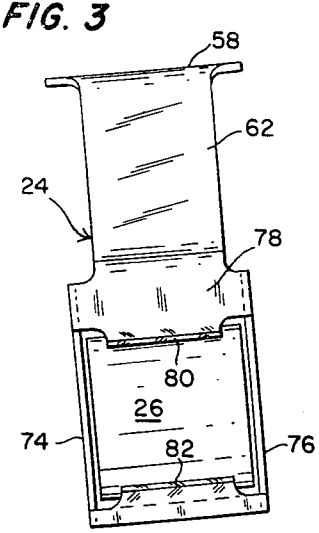
Figure 2:
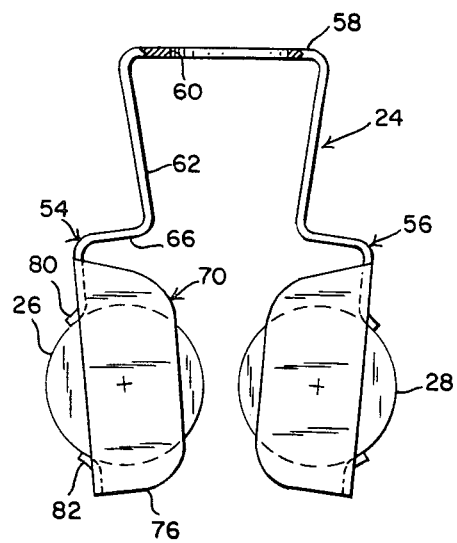
FIG. 2 is a front elevation of the cage and roller assembly as it appears when removed from the brake actuator of FIG. 1.
Figure 5:
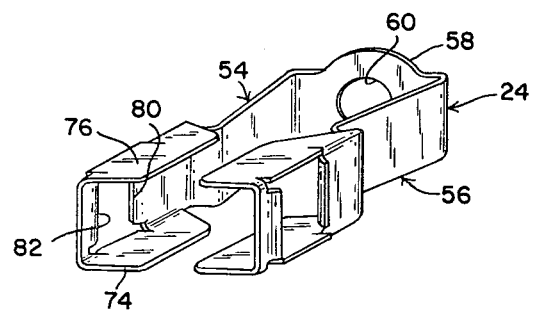

FIG. 3 is a side elevation of the assembly of FIG. 2;
FIG. 4 is a top plan view of the assembly of FIG. 2;
FIG. 5 is a perspective view of the roller cage per se;
FIG. 6 is a fragmentary section illustrating a wedge actuator incorporating a second embodiment of the invention;
FIG. 7 is a front elevation of the cage and roller assembly of FIG. 6 shown separately;
FIG. 8 is a side elevation of the assembly of FIG. 7; and
FIG. 9 is a top plan view of the assembly of FIG. 7.

DESCRIPTION OF PREFERRED EMBODIMENTS

Referring first to the embodiment of FIGS. 1 through 5, the brake actuator comprises a housing 20 rigid with a brake support, not shown, usually fixed to the axle. The construction of the housing and its association with the remaining components of the brake system may be the same as that disclosed in the aforementioned Pat. 3,037,584. The housing 20 contains an actuator mechanism comprising a reciprocable wedge member 22 which carries a cage 24 and rollers 26 and 28, described in detail below, positioned between the inner ends of two opposed aligned plungers 30 and 32 slidably mounted in the housing 20 for reciprocation in a direction normal to the direction of reciprocation of the wedge member 22. The wedge member is carried by the inner end of a push rod 34 associated in the usual manner with a piston or diaphragm of a conventional hydraulic or air actuator preferably in the manner shown in Pat. 3,037,584. The wedge member is normally biased to the brake release position shown in FIG. 1 by a return spring 36 compressed between a guide collar 38 and a stop (not shown) carried by the upper portion of push rod 34.

The outer end of plunger 32 is slotted as at 40 to receive the web 42 of the associated brake shoe. The opposite plunger 30 may include an adjustment mechanism of the type disclosed in U.S. Pat. No. 3,227,247, owned by applicant's assignee. The plunger 30 carries a threaded stud 44, the outer end of which carries a clip 46, the end of the stud 44 and the clip 46 cooperating to contact and guide the web 48 of the associated brake shoe. The usual seal assemblies 50 and 51 are provided to prevent the entry of foreign matter in the interior of housing 20.

The inner ends of the plungers 30 and 32 are normally held against housing abutments 52 and 53 by the usual brake shoe return spring (not shown).

The novel cage and roller assemblies 24, 26 and 28 which afford an anti-friction force-transmitting mechanism between the wedge 22 and the plungers 30 and 32 will now be described in detail with continuing reference to FIGS. 1 through 5. The cage assembly 24 is preferably formed from a single piece of spring steel sheet stock. It comprises a pair of spring arms 54 and 56 connected at one end by a flat mounting section 58 having a circular aperture 60 adapted to fit loosely around the wedge push rod 34. The spring arm 54 comprises an essentially flat section 62 extending generally parallel to the sides of the wedge 22 and connected by an outwardly extending transition section 66 to roller mounting section 70 for loosely supporting the roller 26. The roller mounting section is of U-shaped configuration and includes tabs 74 and 76 bent inwardly from the base section 78 to form end walls of the roller receiving space, the spacing between the end walls being slightly greater than the axial dimension of the roller 26. Base section 78 is provided with an opening bounded at its ends by tabs 74 and 76 and at its top and bottom edges by tabs 80 and 82 struck outwardly from the plane of the base 78 to extend essentially tangentially of the adjacent surface of the roller 26. The opposite spring arm 56 is of identical construction and loosely supports the opposed roller 28 in the same manner.

The inner ends of the plungers 30 and 32 are provided with slots 84 and 86, respectively, the side walls of which are spaced apart to receive the outer surfaces of the cage tabs 74 and 76 with slight clearance and the bottom walls of which are adapted to be engaged by the rollers 26 and 28. Preferably the bottom walls of the slots 84 and 86 are downwardly converging as shown in FIG. 1 to increase the lateral displacement of the plungers 30 and 32 for a given vertical displacement of the wedge 22.

Figure 1:
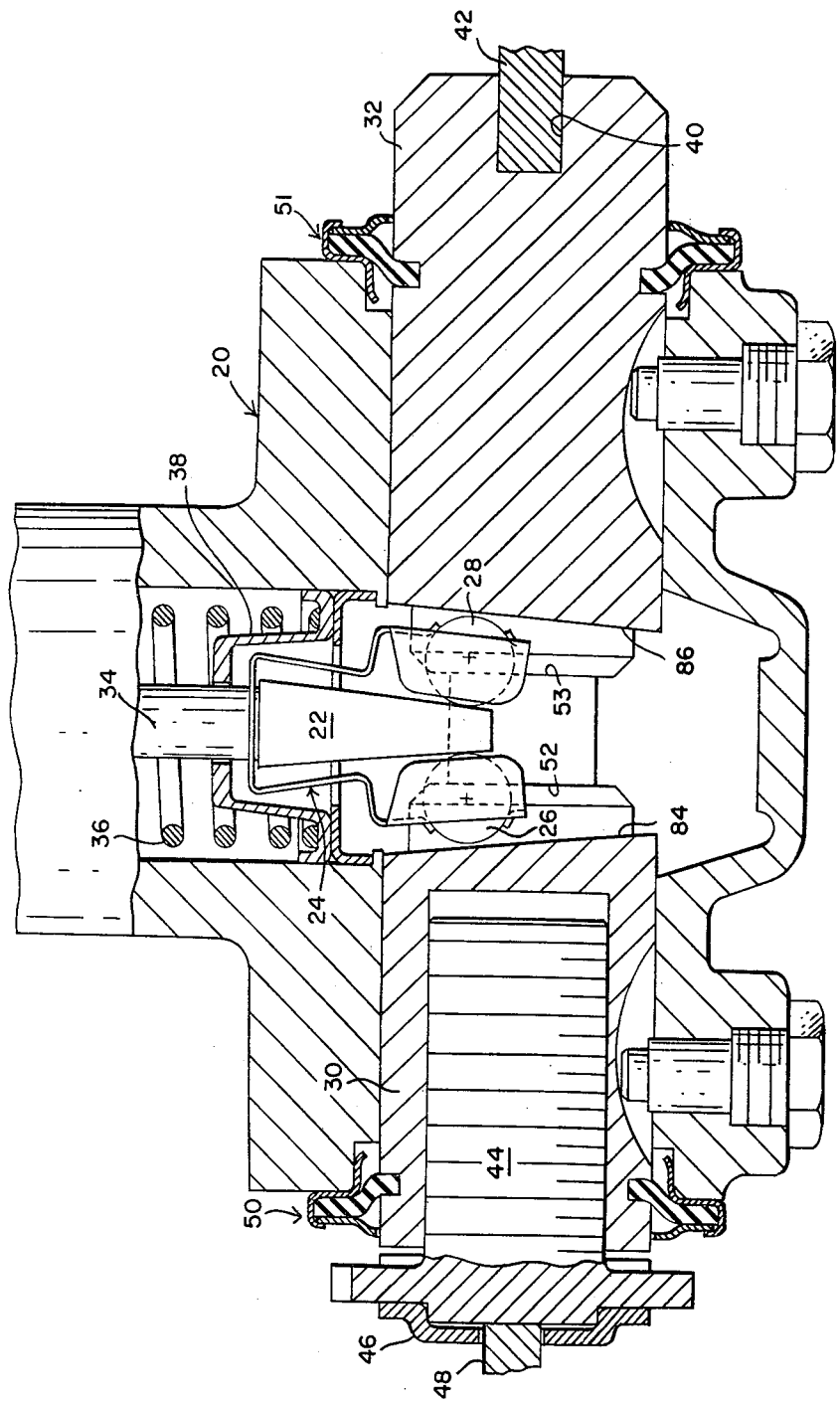
FIG. 1 is a central section through a wedge-type brake actuator incorporating the present invention.

The cage and rollers are so dimensioned that when the cage is relaxed, as shown in FIG. 2, the spacing between the adjacent surfaces of the rollers 26 and 28 is less than the corresponding dimension of the wedge 22 when the latter is retracted as shown in FIG. 1. Accordingly the rollers 26 and 28 are held against the sides of the wedge with light spring force. The diameter of the rollers is such that they are out of contact with the bottom walls of the slots 84 and 86 when the brakes are released. This assures firm abutment of the plungers with the housing surfaces to stabilize the position of the shoes and assure proper operation when the brakes are applied. The length of the rollers 26 and 28 is essentially the same as the corresponding dimensions of the wedge 22 so that the rollers engage the sides of the wedge along their full length.

When the brakes are applied, the action of the atcuator depends to some extent on the direction of rotation of the wheel with which the brakes are associated. For present purposes let it be assumed that the plunger 30 is associated with the leading shoe, the plunger 32 is associated with the trailing shoe and that actuators are provided at each end of each shoe.

When the brakes are applied, push rod 34 moves downwardly and causes the rollers 26 and 28 to be displaced downwardly in rolling contact with the side surfaces of the wedge. As soon as the initial clearance is taken up, the rollers will contact the bottoms of the slots 84 and 86 in the plungers and in the continuing movement of the assembly will displace the plungers outwardly from their positions shown. As soon as the brake shoe associated with the plunger 32 seats against the drum it is urged back in firm abutment with the housing surface 53, displacing the plunger 30 an equal amount to the left.

In the continued downward displacement of the wedge, the rollers move in rolling contact with the side surfaces of the wedge and the bottoms of the respective plunger slots, displacing the plunger 30 to the left as viewed in FIG. 1. The entire assembly comprising the push rods, the wedge, the cage and the rollers is similarly displaced to the left during this movement, this displacement being accommodated by the pivotal connection between the upper end of the push rod 34 and its associated power source. The opening provided in the guide collar 38 is sufficient to accommodate this movement. The total downward displacement of the axes of the rollers is thus one-half the downward displacement of the wedge 22. It will be noted that the rollers 26 and 28 are not secured to the cage 26. Thus, in their movement, the rollers 26 and 28 may freely align themselves between the wedge and the plungers independently of the cage and are thus free to accommodate any inaccuracies in the wedge surfaces or the slots 84 and 86 and unequal movement of the plungers 30 and 32. Due to the absence of bearing surfaces on the cage and the rollers, the friction losses are greatly reduced.

FIGS. 6 through 9, to which detailed reference will now be made, disclose a further embodiment of the present invention in which the cage for supporting the rollers is of modified construction. As before, the cage comprises a single member formed of spring steel sheet stock. The modified cage, indicated generally at 88, comprises a pair of spring arms 90 and 92 joined at their upper ends by a flat mounting section 94 having a circular opening 96 for the loose reception of the push rod 34. Spring arm 90, the main body portion of which is flat, has an opening 98, the vertical end walls of which are spaced apart a distance slightly greater than the length of the cylindrical roller 26. The upper boundary of the opening 98 is formed by a pair of tabs 100 and 102 and the lower boundary is formed by tabs 104 and 106, each of the tabs being struck out of the plane of the spring arm 90. The tabs 100 and 106 are struck outwardly and the tabs 102 and 104 are struck inwardly. The four tabs thus provide a space for loosely receiving the roller 26. The spring arm 92 is of identical construction and includes the upper tabs 108 and 110 and the lower tabs 112 and 114 form a similar space for loosely receiving the opposite roller 28.

In operation the modified cage 88 functions in essentially the same manner as the cage 24 and again permits the rollers 26 and 28 to be self-aligning and to operate with minimum friction and wear.

The invention may be embodied in other specific forms without departing from the spirit or essential characteristics thereof. The present ambodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a wedge type brake actuator in which a power-operated wedge assembly is displaced between adjacent ends of brake shoe engaging plungers; a force-transmitting assembly interposed between said wedge and said plungers comprising a pair of anti-friction rollers, said rollers being cylindrical from end to end and adapted to be in rolling contact with said wedge and an adjacent plunger end, a carrier for said rollers comprising a mounting section adapted to be supported on said wedge assembly and a pair of arms adapted to extend away from said mounting section along the sides of said wedge, and means on said arms for supporting and guiding said rollers, said last-mentioned means contacting said rollers on the cylindrical surfaces thereof.

2. The combination according to claim 1 wherein said arms are provided with openings through which portions of said rollers project together with tabs formed at opposite edges of said openings for engagement with said rollers.

3. The combination according to claim 2 wherein said tabs each project outwardly from said arms toward the associated plunger.

4. The combination according to claim 3 together with essentially flat imperforate spaced apart plates extending from said arms in a direction substantially normal to the axes of said rollers to limit endwise movement of said rollers.

5. The combination according to claim 1 wherein said arms are provided with openings through which portions of said rollers project and a pair of tabs are formed along the edges of said openings which are essentially parallel with the axis of said rollers, said tabs projecting in opposite directions from said arms to form channels engageable with the periphery of said rollers.

6. A carrier for supporting a pair of cylindrical rollers at opposite sides of a wedge brake actuator assembly comprising: a single piece of spring stock having a body portion adapted to be supported on said wedge assembly at one end thereof, a pair of arms adapted to extend from said body portion along the sides of said wedge, said arms having openings through which portions of said rollers project, tabs formed at the opposite side edges of said openings for engagement with the cylindrical surfaces of said rollers and essentially flat imperforate spaced apart plates extending from said arms in a direction substantially normal to the axes of said rollers to limit endwise movement of said rollers.

References Cited

UNITED STATES PATENTS 3,326,330  6/1967  Holt et al. _____ 188—78

FOREIGN PATENTS 1,480,969  4/1967  France.

WESLEY S. RATLIFF, JR., Primary Examiner

U.S. Cl. X.R.

188—152